United States Patent [19]

Irick, Jr. et al.

[11] 4,096,115

[45] Jun. 20, 1978

[54] ULTRAVIOLET LIGHT STABILIZED POLYMERS

[75] Inventors: Gether Irick, Jr.; Charles A. Kelly, both of Kingsport, Tenn.

[73] Assignee: Eastman Kodak Company, Rochester, N.Y.

[21] Appl. No.: 745,950

[22] Filed: Nov. 29, 1976

Related U.S. Application Data

[62] Division of Ser. No. 484,845, Jul. 1, 1974, abandoned.

[51] Int. Cl.$^2$ .......................... C08K 5/46; C08K 5/47; C08K 5/34; C08K 5/35
[52] U.S. Cl. .................... 260/45.8 RW; 260/45.85 R; 260/45.8 NT; 260/45.8 SN; 260/45.8 NZ; 260/45.95 F; 106/176
[58] Field of Search .............. 260/45.8 RW, 45.8 NT, 260/45.8 SN, 45.8 NZ, 45.85 R, 45.95 F; 106/176

[56] References Cited

U.S. PATENT DOCUMENTS

| 3,322,705 | 5/1967 | Kauder et al. | 260/45.95 F |
| 3,666,713 | 5/1972 | Wear | 260/45.95 F |
| 3,808,278 | 4/1974 | Avar | 260/45.95 F |
| 3,833,658 | 9/1974 | Avar et al. | 260/45.95 F |

*Primary Examiner*—V. P. Hoke
*Attorney, Agent, or Firm*—Clyde L. Tootle; Daniel B. Reece, III

[57] ABSTRACT

The invention relates to aryl ester-based compounds which have been found to be extremely effective ultraviolet stabilizers. The invention also relates to ultraviolet degradable organic compositions containing an amount of an aryl ester-based composition to prevent such degradation. These stabilizers are effective in the presence of other additives commonly employed in polymeric compositions including, for example, pigments, colorants, fillers, reinforcing agents and the like. These ultraviolet stabilizers may be incorporated into the organic compositions such as polymers in the polymer melt or dissolved in the polymer dope, or coated on the exterior of the shaped or molded article, film or extruded fiber.

69 Claims, No Drawings

ULTRAVIOLET LIGHT STABILIZED POLYMERS

This is a division of application Ser. No. 484,845, filed July 1, 1974, now abandoned.

This invention relates to ultraviolet stabilizers and their use in organic compositions. More particularly, the invention relates to aryl ester based compositions and the stabilization of ultraviolet degradable organic compositions against deterioration resulting from the exposure to light with aryl ester-based compositions.

The degradative effects of ultraviolet light on various organic compositions is well known in the art. The photo-deterioration or degradation is of particular concern with organic photo-degradable compositions which are exposed to ultraviolet light, such as sunlight, for long periods of time. One group of such photo-degradable organic compositions is polymeric compositions such as polyolefins, polyesters and the like. On exposure to sunlight for extended periods of time, these polymeric compositions degrade and their physical properties are reduced to render the polymeric composition less useful for most applications. Therefore, considerable effort has been directed to providing a solution to the photo-degradation problem of polymeric compositions. As a result of this effort, there have been discovered many additives and stabilizers which improve the stability of polymeric compositions.

Moreover, various additives and stabilizers exhibit the power to absorb electromagnetic radiation within the band of 2900 to 4000 A. and, when incorporated in various plastic materials, such as transparent sheets, the resultant sheet acts as a filter for all the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

While there are many additives, stabilizers and mixtures thereof which are known in the art to improve the ultraviolet light stability of organic compositions, there is a need in the art for more efficient and effective stabilizers to prevent the photo-degradation of organic compositions susceptible to photo-degradation. Therefore, to provide a more effective and efficient ultraviolet stabilizer for organic compositions susceptible to such degradation would be an advance in the state of the art.

It is, therefore, an object of the present invention to provide more effective and efficient ultraviolet light stabilizer compositions.

Another object of the present invention is to provide useful compositions characterized by improved resistance to ultraviolet degradation and deterioration.

Still another object of the present invention to provide compositions containing aryl esters which are resistant to ultraviolet degradation.

A further object of this invention to provide processes for improving the resistance of organic materials to deterioration and degradation by actinic radiation and especially ultraviolet radiation.

It is a still further object of this invention to provide compositions and processes for improving the resistance of organic materials to deterioration and degradation by actinic radiations including short wave-length visible radiations.

Further objects and advantages of the invention will be apparent to those skilled in the art from the accompanying disclosure and claims.

In accordance with the present invention, organic compositions are provided which are useful as ultraviolet stabilizers or ultraviolet screening agents. These organic compositions contain an aryl group connected through a carboxyl group to another aromatic ring which upon exposure to ultraviolet light may undergo the "photo-Fries" rearrangement. The organic compositions of the present invention are aryl esters of aromatic acids having the following structure:

$$A-\overset{\overset{\displaystyle O}{\|}}{C}-O-B$$

The group A is an aryl moiety selected from the group consisting of components having the formula

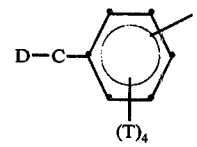

wherein

T is a hydrogen, lower alkyl, substituted lower alkyl, cycloalkyl, substituted cycloalkyl, aryl, substituted aryl, lower alkylaryl, arylsubstituted-aryl, chloro, bromo, alkoxy, substituted amino, cyano:

The C group is a moiety consisting of vinyl, lower alkyloxy, oxy-lower-alkyl and oxy;

The group D is a moiety having the structure

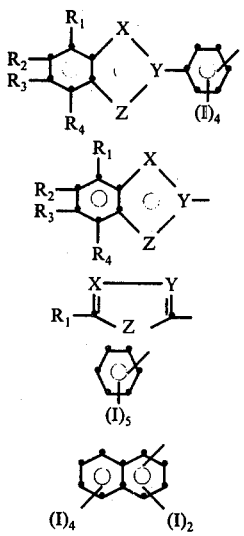

wherein

X and Y are a carbon atom or a nitrogen atom;

Z is an oxygen atom, a sulfur atom, a nitrogen atom, or a nitrogen atom containing a hydrogen atom or a substituted or unsubstituted lower alkyl group having 1 to 12 carbon atoms;

$R_1$, $R_2$, $R_3$ and $R_4$ are hydrogen, lower alkyl, substituted lower alkyl, cycloalkyl, substituted cycloalkyl, aryl, substituted aryl, lower alkylaryl, aryl-substituted-aryl, chloro, bromo, alkoxy, substituted amino, cyano and the substituents $R_1$ and $R_2$, $R_2$ and $R_3$, and $R_3$ and $R_4$, combined with the carbon atoms to which they are attached, are joined alkylene groups completing a carbocyclic ring, which ring can also be substituted with one or more of the substituents listed above for $R_1$, $R_2$, $R_3$ and $R_4$. Lower alkyl groups, in this application, means branched and unbranched alkyl groups containing 1 to 12 carbon atoms. The substituted alkyl, cycloalkyl or aryl means any of the substituents listed for $R_1$ to $R_4$. Alkyl or alkoxy means a branched or unbranched alkyl group containing 1 to 20 carbon atoms.

I is a substituent listed above for $R_1$, $R_2$, $R_3$ and $R_4$ anodes present on all positions of the benzenoid ring, except the carbon atom attached to the Y substituent and the carbon atom attached to the carboxyl group connecting the heterocyclic aromatic A group with the aromatic B group. The carbonyl connecting group is attached to the benzenoid ring in either the meta or para position from the carbon atom connected to the Y substituent. The I substituents can all be one of the substituents listed above or different listed substituents.

The group B is an aryl group of a phenolic aryl component having the formula

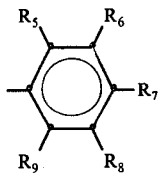

wherein $R_5$, $R_6$, $R_7$, $R_8$ and $R_9$ are hydrogen, lower alkyl, substituted lower alkyl, cycloalkyl, substituted cycloalkyl, aryl, substituted aryl, lower alkylaryl, aryl-substituted-aryl, alkoxy, hydroxy, substituted amino, carboalkoxy, nitrile, chloro, bromo and the substituents $R_5$ and $R_6$, $R_6$ and $R_7$, $R_7$ and $R_8$, and $R_8$ and $R_9$, combined with the carbon atoms to which they are attached, are joined alkylene groups completing a carbocyclic ring which can also be substituted with any of the substituents listed above for $R_5$, $R_6$, $R_7$, $R_8$ and $R_9$. Lower alkyl and substituted means the same as defined above for the A group.

Suitable heterocyclic D groups having the structure

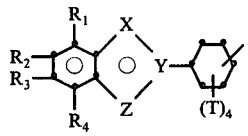

are, for example, substituted and unsubstituted benzoxazoles, benzotriazoles, benzothiazoles and benzimidazoles.

Examples of suitable benzoxazole moieties are those having the formula

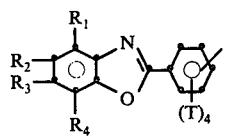

such as 4-(5,6-dimethyl-2-benzoxazolyl)phenyl, 4-(2-benzoxazolyl)-2-chlorophenyl, 3-(5-chloro-2-benzoxazolyl)phenyl.

Examples of suitable benzotriazole moieties are those having the formula

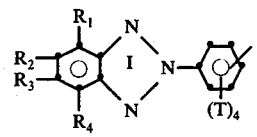

such as 4-(5-chloro-2H-benzotriazol-2-yl)phenyl, 4-(2H-benzotriazol-2-yl)-phenyl, 4-(5-methoxy-2H-benzotriazol-2-yl)phenyl.

Examples of suitable benzothiazole moieties are those having the formula

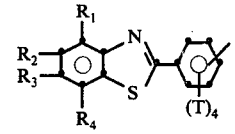

such as 4-(5,6-dimethyl-2-benzothiazolyl)phenyl, 4-(2-benzothiazolyl)-2-chlorophenyl, 3-(5-chloro-2-benzothiazolyl)phenyl.

Examples of suitable benzimidazole moieties are those having the formula

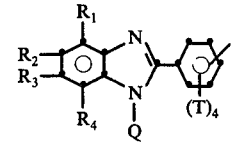

wherein Q is a hydrogen or a substituted or unsubstituted lower alkyl group containing 1 to 12 carbon atoms.

Such benzimidazole moieties are, for example, 4-(5,6-dimethyl-2-benzimidazolyl)phenyl, 4-(2-benzimidazolyl)-2-chlorophenyl, 3-(5-chloro-2-benzimidazolyl)phenyl, 4-(1-methyl-2-benzimidazolyl)phenyl, 4-(1-ethyl-5-chloro-2-benzimidazolyl)phenyl.

Examples of suitable indole moieties are those having the formula

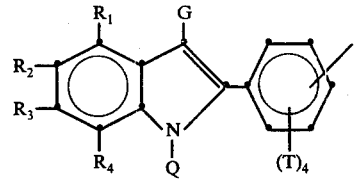

wherein G is the same as $R_1$ and Q is hydrogen or a substituted or unsubstituted lower alkyl containing 1 to 12 carbon atoms, such as 3-(1-ethyl-3-cyano-2-indolyl)-phenyl, 3-(5-chloro-2-indolyl)phenyl, 3-(1-methyl-2-indolyl)phenyl, 3-(3-methyl-2-indolyl)phenyl, 3-(3-chloro-2-indolyl)phenyl, 3-(5-acetamido-2-indolyl)phenyl, 3-(2-indolyl)phenyl, 4-(1-ethyl-2-indolyl)phenyl, 4-(3-cyano-2-indolyl)phenyl, 4-(5-methoxy-2-indolyl)phenyl, 4-(1-methyl-2-indolyl)phenyl, 4-(3-methyl-5-phenyl-2-indolyl)phenyl, 4-(3,5-dichloro-2-indolyl)phenyl, and 4-(2-indolyl)phenyl.

Suitable D groups having the formula

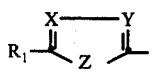

are, for example, substituted and unsubstituted 2-oxadiazolyl, 2-thiazolyl, 2-triazolyl, 2-oxazolyl, and 2-imidazolyl and the like.

Examples of suitable 2-oxadiazolyl moieties are those having the formula:

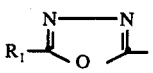

such as 5-(4-chlorophenyl)-1,3,4-oxadiazol-2-yl, 5-phenyl-1,3,4-oxadiazol-2-yl, 5-methylsulfonyl-1,3,4-oxadiazol-2-yl, 5-(2,4-dichlorophenyl)-1,3,4-oxadiazol-2-yl, 5-methyl-1,3,4-oxadiazol-2-yl, 5-(4-phenyl)phenyl-1,3,4-oxadiazol-2-yl, 5-cyano-1,3,4-oxadiazol-2-yl, 5-(4-cyanophenyl)-1,3,4-oxadiazol-2-yl, and 5-(4-methoxyphenyl)-1,3,4-oxadiazol-2-yl, and the like.

Examples of suitable 2-thiadiazolyl moieties are those having the formula:

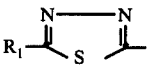

such as 5-phenyl-1,3,4-thiadiazol-2-yl, 5-(4-chlorophenyl)-1,3,4-thiadiazol-2-yl, 5-methylsulfonyl-1,3,4-thiadiazol-2-yl, 5-ethoxy-1,3,4-thiadiazol-2-yl, 5-phenyl-1,3,4-thiadiazol-2-yl, 5-(4-phenyl)phenyl-1,3,4-thiadiazol-2-yl, 5-cyclohexyl-1,3,4-thiadiazol-2-yl, 5-(3-methoxyphenyl)-1,3,4-thiadiazol-2-yl, and 5-cyano-1,3,4-thiadiazol-2-yl, and the like.

Examples of suitable 2-triazolyl moieties are those having the formula:

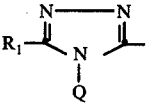

wherein Q is hydrogen or a substituted or unsubstituted lower alkyl group containing 1 to 12 carbon atoms, such as 5-phenyl-1,3,4-triazol-2-yl, 5-(4-cyanophenyl)-1,3,4-triazol-2-yl, 5-cyano-1,3,4-triazol-2-yl, 4-(4-methoxyphenyl)-1,3,4-triazol-2-yl, 1-(n-butyl)-5-(2,4-dichlorophenyl)-1,3,4-triazol-2-yl, 1,3,4-triazol-2-yl, 5-phenyl-1,3,4-triazol-2-yl, 5-methylsulfonyl-1,3,4-triazol-2-yl, 1-methyl-5-phenyl-1,3,4-triazol-2-yl, and the like.

Examples of suitable 2-oxazolyl moieties are those having the formula:

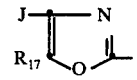

wherein J is the same as $R_1$, such as 5-phenyl-2-oxazolyl, 4,5-diphenyl-2-oxazolyl, 4,5-dimethyl-2-oxazolyl, 4-chloro-5-cyano-2-oxazolyl, 4-phenyl-5-cyano-2-oxazolyl, 5-methylsulfonyl-2-oxazolyl, 5-cyclohexyl-2-oxazolyl, 4,5-dichloro-2-oxazolyl, 5-ethoxy-2-oxazolyl, and the like.

Examples of suitable 2-thiazolyls are thiazolyls having the formula:

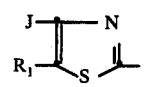

wherein J is the same as $R_1$, such as 4-phenyl-5-chloro-2-thiazolyl, 4,5-dichloro-2-thiazolyl, 4-chloro-5-cyano-2-thiazolyl, 4-ethoxy-5-phenyl-2-thiazolyl, 4,5-dimethyl-2-thiazolyl, 4,5-dicyano-2-thiazolyl, 5-phenyl-2-thiazolyl, and the like.

Examples of suitable 2-imidazolyl moieties are those having the formula:

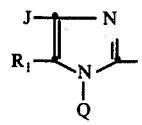

wherein J is the same as $R_1$ and Q is hydrogen or a substituted or unsubstituted lower alkyl having 1 to 12 carbon atoms, such as 1-methyl-4,5-diphenyl-2-imidazolyl, 4-chloro-5-cyano-2-imidazolyl, 5-phenyl-2-imidazolyl, 1-ethyl-5-phenyl-2-imidazolyl, 4,5-diphenyl-2-imidazolyl, 1-benzyl-4-phenyl-5-cyano-2-imidazolyl, 1-methyl-4-cyano-2-imidazolyl, 4-methoxy-5-phenyl-2-imidazolyl, 4,5-dichloro-1-benzyl-2-imidazolyl, the the like.

Suitable D groups having the formula

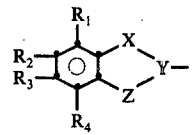

are, for example, substituted and unsubstituted 2-benzoxazolyl, 2-benzothiazolyl, 2-benzimidazolyl and benzotriazolyl.

Examples of suitable 2-benzoxazolyl moieties are those having the formula

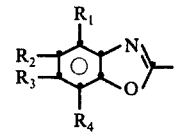

such as 5,6-dimethyl-2-benzoxazolyl, 2-benzoxazolyl, 5-chloro-2-benzoxazolyl, 5,6-dichloro-2-benzoxazolyl, 4,5-diethyl-2-benzoxazolyl, 5-cyano-2-benzoxazolyl, 5-methoxy-6-methyl-2-benzoxazolyl, for 4-chloro-5-phenyl-2-benzoxazolyl.

Examples of suitable 2-benzothiazolyl moieties are those having the formula

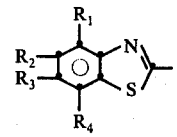

such as 2-benzothiazolyl, 5,6-dimethyl-2-benzothiazolyl, 5,6-dichloro-2-benzothiazolyl, 5-chloro-2-benzothiazolyl, 5-methoxy-2-benzothiazolyl, 6-methylsulfonyl-2-benzothiazolyl, 6-cyano-2-benzothiazolyl, 6- methylthio-2-benzothiazolyl, and 6-methyl-2-benzothiazolyl.

Examples of suitable 2-benzimidazolyl moieties are those having the formula

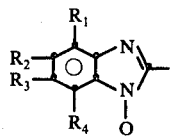

wherein Q is hydrogen or a substituted or unsubstituted lower alkyl containing 1 to 12 carbon atoms, such as 2-benzimidazolyl, 1-methyl-2-benzimidazolyl, 1,5,6-trimethyl-2-benzimidazolyl, 6-cyano-1-ethyl-2-benzimidazolyl, 6-chloro-2-benzimidazolyl, 5-methoxy-1-benzyl-2-benzimidazolyl, 6-methylsulfonyl-2-benzimidazolyl, 4-methoxy-1-methyl-2-benzimidazolyl, and the like.

Examples of suitable 2-indolyl moieties are those having the formula

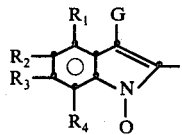

wherein G is the same as $R_1$ and
Q is hydrogen or a substituted or unsubstituted lower alkyl containing 1 to 12 carbon atoms. Such suitable indole moieties are, for example, 1-ethyl-3-cyano-2-indolyl, 5-chloro-2-indolyl, 1-methyl-2-indolyl, 3-methyl-2-indolyl, 3-chloro-2-indolyl, 5-acetamido-2-indolyl, 1-benzyl-2-indolyl, 3-cyano-2-indolyl, 5-methoxy-2-indolyl, 1-methyl-2-indolyl, 3-methyl-5-phenyl-2-indolyl, 3,5-dichloro-2-indolyl and 2-indolyl.

Suitable D groups having the formula

are, for example, 3-methylphenyl, 2-methyl-3-chlorophenyl, 4-phenylphenyl, 2,4-dichlorophenyl, 4-methoxyphenyl, 3-cyanophenyl, 2,4-dimethylphenyl, 4-bromophenyl, and the like.

Suitable D groups having the formula

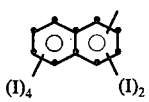

are, for example 1-naphthyl, 2-naphthyl, 4-methyl-1-naphthyl, 2,4-dichloro-1-naphthyl, 4-chloro-1-naphthyl, 2-chloro-1-naphthyl, 2-methoxy-1-naphthyl, and 5-ethoxy-1-naphthyl.

Suitable C moieties are vinyl such as —CH=CH—; lower alkyloxy, such as methoxy and ethoxy; oxy-lower-alkyl, such as oxymethyl, oxyethyl and the like; and oxy, such as —O—. When C is oxy-lower-alkyl or oxyethyl, the —O— atom is joined to a carbon atom. Therefore, when C is oxy-lower-alkyl or oxyethyl, Y is a carbon atom.

Suitable B groups having the formula

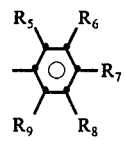

are, for example, 2,4-dimethoxyphenyl, 3-methoxyphenyl, 3-methylphenyl, 4-octylphenyl, 4-dodecylphenyl, 3-octylphenyl, 2,4-dichlorophenyl, 4-methoxyphenyl, 2,4-di-t-butylphenyl, 3-(2-ethylhexyloxy)phenyl, 3-dodecyloxyphenyl, 4-cyanophenyl, 4-bromophenyl, 3-hydroxyphenyl and 3-cyclohexylphenyl.

The aryl ester-based compounds can be prepared by reacting the acid chloride with a phenol. For example, one specific group of organic compounds useful as ultraviolet stabilizers is, for example, stilbene ester-based compositions having the formula

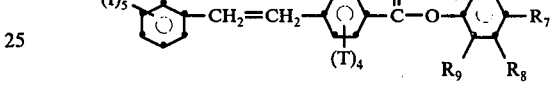

These organic compounds can be prepared according to the following procedure:

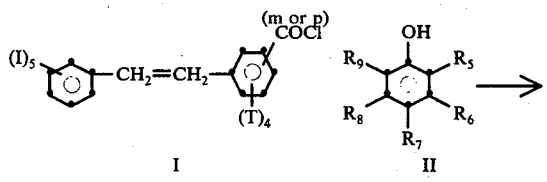

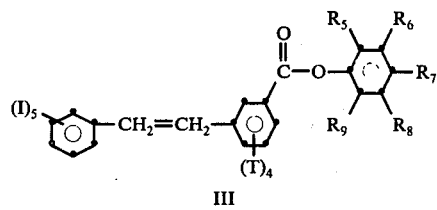

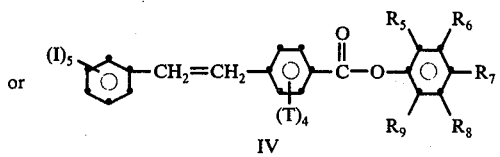

Substituents I, T and $R_5$ to $R_9$ are defined hereinabove. It is necessary that at least one of $R_5$ or $R_9$ be hydrogen so that, on exposure to ultraviolet light, the aryl ester of the heterocyclic aromatic acid is capable by the "photo-Fries" rearrangement of forming a phenol group in that position formerly joined through an oxygen atom to the carbonyl linking group, as for example

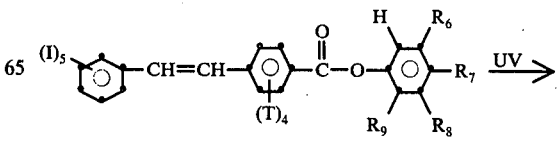

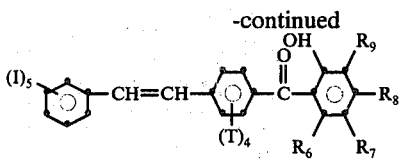

The acid chlorides (I) were prepared by reaction of the corresponding acid [See *Zh. Obshch. Khim.*, 38, 100 1-5 (1968); *Chem. Abstr.* 69 96568 (1968)] with freshly distilled thionyl chloride [See *J. Chem. Soc.* 101, 2476 (1912)]. The phenols were obtained from commercial sources, or were prepared by standard methods; a critical requirement is that one of the positions adjacent the phenolic hydroxyl group be unsubstituted.

The aryl ester based compositions can be added to organic compositions which are susceptible to ultraviolet degradation. Such compositions include, for example, polymeric compositions such as polyester fiber and moldable compositions, such as poly(ethylene terephthalate), poly(tetramethylene terephthalate), unsaturated polyester resins and the like; polyolefins such as, for example, high, medium and low density polyethylene, polypropylene, polybutene and the like; polyamides such as N-methoxymethyl polyhexamethylene adipamide and the like; polycarbonates; polyvinyl chloride and copolymers; cellulose esters; acrylic/butadiene/styrene plastics; polyacrylics such as methyl methacrylate; polystyrene; gelatin; vinylidene chloride copolymers such as vinylidene chloride/vinyl acetate copolymers; ethylene/vinyl acetate copolymers; cellulose ethers such as methyl cellulose; polyvinyl esters such as polyvinyl acetate; polyethylene oxides; polyvinyl acetals; polyformaldehydes; and polyurethanes. Such compositions also include natural and synthetic rubbers, such as polybutadiene, and unsaturated organic compositions such as oils and the like, as well as compositions containing such organic compositions.

The aryl ester compositions as effective ultraviolet stabilizers or screening agents are generally used in an amount of from 0.01 to 10%, by weight, based on the weight of the organic material to which they are added. While a detectable amount of ultraviolet screening and stabilization may be obtained with amounts less than 0.01%, this amount of stabilization or screening would be of little practical utility in a commercial application. Moreover, while amounts greater than 10%, by weight, provide effective ultraviolet stability and screening, such concentrations are undesirable because of cost and the deleterious effect which such concentrations may have on the mechanical properties of the organic composition in which the stabilizer is incorporated. Preferably, the stabilizer is used in an amount of from about 0.1 to about 5%, by weight. For example, an amount of 2% by weight of the stabilizer effectively stabilizes cellulose acetate butyrate plastic compositions.

The ultraviolet stabilized organic compositions containing the stabilizers of the present invention may also contain other additives, pigments, colorants, stabilizers and the like. For example, polymeric compositions, such as polyolefins, may also contain, and generally do contain, other additives such as white or colored pigments or colorants, antioxidants, plasticizers, flow aids, processing aids, polymeric modifiers and the like.

These aryl ester based ultraviolet stabilizers may be incorporated into organic compositions by melt-blending or may be added onto the surface of an organic plastic material prior to being molded into a suitable object or added to the surface of the molding object. These materials can also be added to coatings and the like which can be applied to the surface of a molded object.

This invention will be further illustrated by the following examples, although it will be understood that these examples are included merely for purposes of illustration and are not intended to limit the scope of the invention.

EXAMPLE 1

3-Octyloxyphenyl 4-(2-benzoxazolyloxy)benzoate can be prepared by the following procedure:

A mixture of 0.1 mole methyl 4-hydroxybenzoate, 0.1 mole potassium hydroxide, 2 g. cuprous oxide and 100 ml. dimethylformamide was heated to 120° C. with stirring. 2-Bromobenzoxazole (0.1 mole) was then added after 1 hour, and the mixture stirred for 6 hours and decanted from the copper residue into 500 ml. water. The solid was separated by filtration, washed with water and added to a flask containing 300 ml of 6% hydrochloric acid. After stirring overnight, the mixture was neutralized with 6% sodium hydroxide and the solid collected, washed with water and dried. The intermediate acid was converted to the acid chloride by reaction with thionyl chloride and was reacted with 3-octylphenol to provide a 20% overall yield of colorless product.

EXAMPLE 2

4-Methylphenyl 4-(2-benzoxazolylvinyl)benzoate can be prepared by the following procedure:

A mixture of 0.1 mole 2-methylbenzoxazole, 0.1 mole methyl p-formylbenzoate, 0.5 g. piperidine and 200 ml. dimethylformamide was stirred at 120° C. for 6 hours, and poured into 600 ml. water. The solid was separated by filtration, washed with water and added to a flask containing 300 ml. 6% hydrochloric acid. After stirring overnight, the mixture was neutralized with 6% sodium hydroxide and the solid collected, washed with water and dried. The intermediate acid was converted to the acid chloride by reaction with thionyl chloride and was reacted with 4-methylphenol to provide a 20% overall yield of colorless product.

EXAMPLE 3

4-Chlorophenyl 4-(2-benzoxazolylbenzyloxy)benzoate can be prepared by the following procedure:

A mixture of 0.1 mole methyl 4-hydroxybenzoate, 0.1 mole potassium hydroxide, 2 g. cuprous oxide and 100 ml. dimethylformamide was heated to 120° C. with stirring. 4-(2-Benzoxazolyl)benzyl bromide (0.1 mole) was then added, and the mixture stirred for 6 hours and decanted from the copper residue into 500 ml. water. The solid was separated by filtration, washed with water and added to a flask containing 300 ml. 6% hydrochloric acid. After stirring overnight the mixture was neutralized with 6% sodium hydroxide and the solid collected, washed with water and dried. The intermediate acid was converted to the acid chloride by reaction with thionyl chloride and was reacted with 4-chlorophenol to provide a 20% overall yield of colorless product.

EXAMPLE 4

4-Isooctylphenyl 4-(2-benzoxazolyloxymethyl)benzoate can be prepared by the following procedure:

A mixture of 0.1 mole 2-hydroxybenzoxazole, 0.1 mole potassium hydroxide, 1 g. cuprous oxide and 100 ml. dimethylformamide was heated to 120° C. with stirring. Methyl 4-bromomethylbenzoate (0.1 mole) was then added, and the mixture stirred for 6 hours and decanted from the copper residue into 500 ml. water. The solid was separated by filtration, washed with water and added to a flask containing 300 ml. 6% hydrochloric acid. After stirring overnight the mixture was neutralized with 6% sodium hydroxide and the solid collected, washed with water and dried. The intermediate acid was converted to the acid chloride by reaction with thionyl chloride and was reacted with 4-isooctylphenol to provide a 20% overall yield of colorless product.

EXAMPLE 5

The stabilizers of this invention can also be made by the following reactions:

I when C is an ether group:

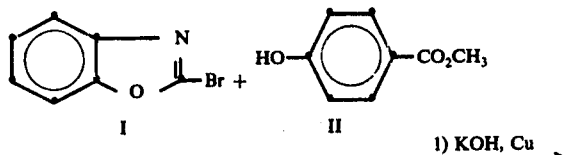

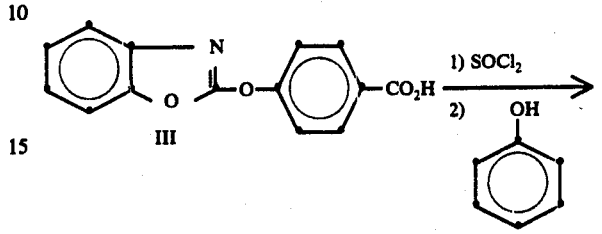

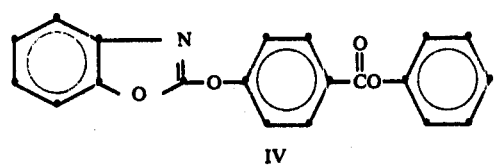

II when C is a vinyl group:

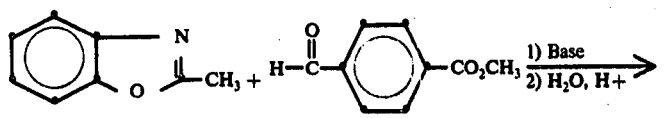

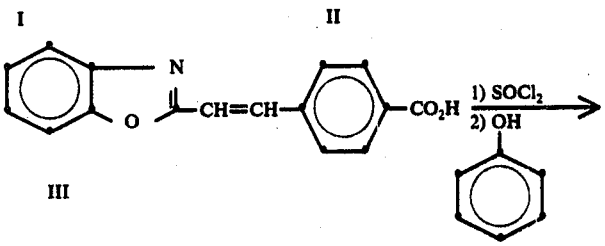

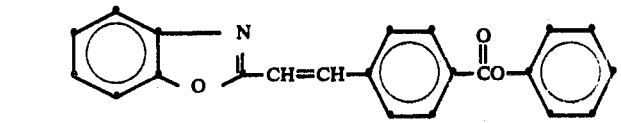

III when C is an alkoxy group:

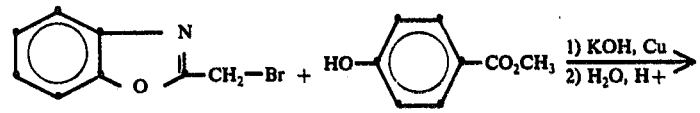

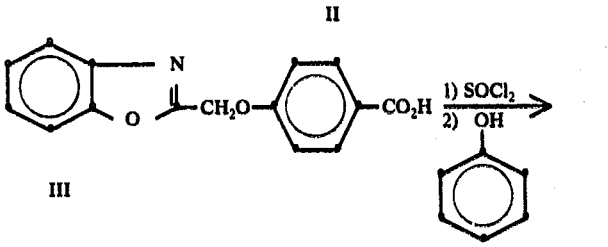

-continued

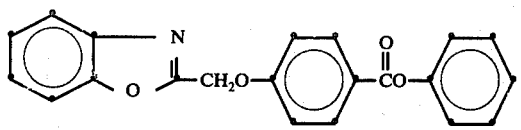

IV

IV when C is an oxyalkyl group:

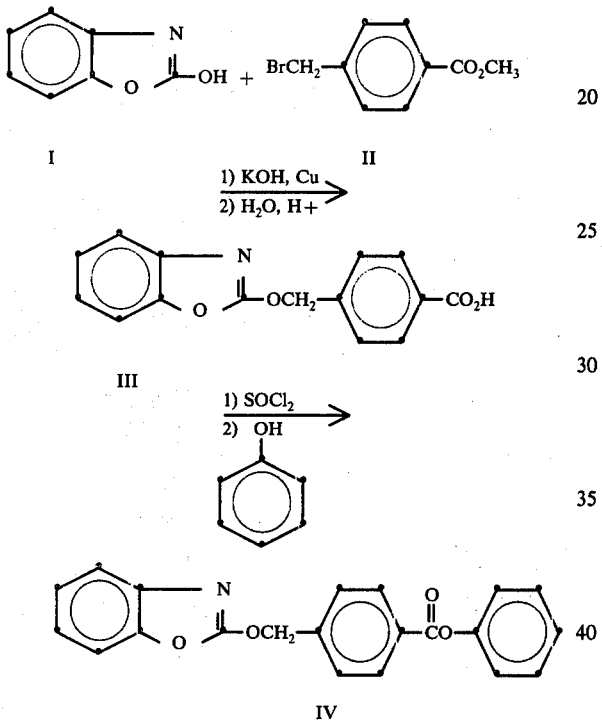

IV

These aryl ester compositions find particular utility as ultraviolet stabilizers in organic compositions requiring ultraviolet stability. Such compositions include polymeric compositions such as, for example, polyester fiber and molding compositions; poly-α-olefins; polyamides; acrylics; cellulose esters and the like; as well as molded or shaped articles, film and coatings formed from such materials, and the like. Such compositions also include natural and synthetic rubbers, such as natural rubber, as well as organic materials such as oils, fats, and unsaturated organic materials, and materials having such materials contained therein such as paints, varnishes, cosmetics and the like.

The invention has been described in detail with particular reference to preferred embodiments thereof, but it will be understood that variations and modifications can be effected within the spirit and scope of the invention.

We claim:

1. An organic synthetic and natural polymer composition susceptible to ultraviolet light degradation stabilized against such degradation with a stabilizing amount of at least one aryl ester of a heterocyclic aromatic acid having the formula:

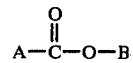

wherein A is a moiety selected from the group consisting of moieties having the formula:

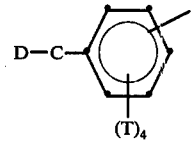

wherein
T is a hydrogen, lower alkyl, substituted lower alkyl, cycloalkyl, substituted cycloalkyl, aryl, substituted aryl, lower alkylaryl, aryl-substituted-aryl, chloro, bromo alkoxy, substituted amino, cyano;
C is a member selected from the group consisting of vinyl, lower alkyloxy, oxy-lower alkyl and oxy;
wherein
D is a member selected from the group of moieties having the formula:

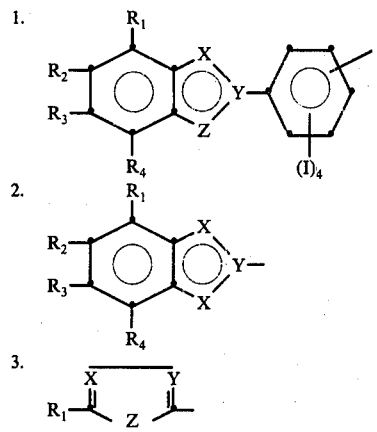

wherein
X and Y are a carbon atom or a nitrogen atom;
Z is an oxygen atom, a sulfur atom, a nitrogen atom, or a nitrogen atom containing a hydrogen atom or a substituted or unsubstituted lower alkyl group containing 1 to 12 carbon atoms;
$R_1$, $R_2$, $R_3$ and $R_4$ are hydrogen, chloro, bromo, lower alkyl, substituted lower alkyl, cycloalkyl, substituted cycloalkyl, aryl, substituted aryl, lower alkylaryl, aryl-substituted-aryl, alkoxy, substituted amino, cyano and the substituents $R_1$ and $R_2$, $R_2$ and $R_3$, and $R_3$ and $R_4$ combined with the carbon atoms to which they are attached are joined alkylene groups completing a carbocyclic ring, which ring can also be substituted with one or more of the substituents listed above for $R_1$, $R_2$, $R_3$ and $R_4$;

I is the same as $R_1$, $R_2$, $R_3$ and $R_4$ and is present on all positions of the benzenoid ring, except the carbon atom attached to the Y substituent and the carbon atom attached to the carboxyl group connecting the heterocyclic aromatic A group with the aromatic B group, said carbonyl connecting group is attached to the benzenoid ring in either the meta or para position from the carbon atom connected to the Y substituent; and B is a group having the formula

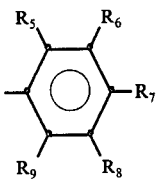

wherein at least one $R_5$ or $R_9$ is hydrogen and the other $R_5$, $R_6$, $R_7$, $R_8$ and $R_9$ are hydrogen, lower alkyl, substituted lower alkyl, cycloalkyl, substituted cycloalkyl, aryl, substituted aryl, lower alkylaryl, aryl-substituted-aryl, alkoxy, substituted amino, hydroxy, carboalkoxy, nitrile, chloro, bromo and the substituents $R_5$ and $R_6$, $R_6$ and $R_7$, $R_7$ and $R_8$, and $R_8$ and $R_9$ combined with the carbon atoms to which they are attached are joined alkylene groups completing a carbocyclic ring which can be substituted with any of the substituents listed above for $R_5$, $R_6$, $R_7$, $R_8$ and $R_9$.

2. A composition of matter according to claim 1 wherein A has the structure:

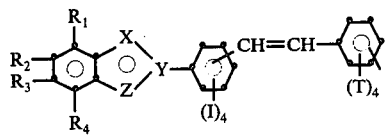

wherein
$R_1$, $R_2$, $R_3$ and $R_4$ are hydrogen, chloro, bromo, lower alkyl, substituted lower alkyl, cycloalkyl, substituted cycloalkyl, aryl, substituted aryl, lower alkylaryl, aryl-substituted-aryl, alkoxy, substituted amino, cyano and the substituents $R_1$ and $R_2$, $R_2$ and $R_3$, and $R_3$ and $R_4$ combined with the carbon atoms to which they are attached are joined alkylene groups completing a carbocyclic ring, which ring can also be substituted with one or more of the substituents listed above for $R_1$, $R_2$, $R_3$ and $R_4$;

X and Y are a carbon atom or a nitrogen atom;

Z is an oxygen atom, a sulfur atom, a nitrogen atom, or a nitrogen atom containing a hydrogen atom or a substituted or unsubstituted lower alkyl group containing 1 to 12 carbon atoms;

I is the same as $R_1$, $R_2$, $R_3$ and $R_4$ and is present on all positions of the benzenoid ring, except the carbon atom attached to the Y substituent and the carbon atom attached to the carboxyl group connecting the heterocyclic aromatic A group with the aromatic B group, said carbonyl connecting group is attached to the benzenoid ring in either the meta or para position from the carbon atom connected to the Y substituent; and T is a hydrogen, lower alkyl, substituted lower alkyl, cycloalkyl, substituted cycloalkyl, aryl, substituted aryl, lower alkylaryl, aryl-substituted-aryl, chloro, bromo, alkoxy, substituted amino, cyano.

3. An organic composition according to claim 1 wherein X is a carbon atom.

4. An organic composition according to claim 2 wherein X is a nitrogen atom.

5. An organic composition according to claim 3 wherein Y is a carbon atom.

6. An organic composition according to claim 3 wherein Y is a nitrogen atom.

7. An organic composition according to claim 5 wherein Z is a sulfur atom.

8. An organic composition according to claim 5 wherein Z is a nitrogen atom.

9. An organic composition according to claim 5 wherein Z is a nitrogen atom containing hydrogen or a substituted or unsubstituted lower alkyl group having 1 to 12 carbon atoms.

10. An organic composition according to claim 5 wherein Z is an oxygen atom.

11. An organic composition according to claim 6 wherein Z is a sulfur atom.

12. An organic composition according to claim 6 wherein Z is a nitrogen atom.

13. An organic composition according to claim 6 wherein Z is a nitrogen atom containing hydrogen or an alkyl group having 1 to 12 carbon atoms.

14. An organic composition according to claim 6 wherein Z is an oxygen atom.

15. An organic composition according to claim 3 wherein Y is nitrogen.

16. An organic composition according to claim 15 wherein Z is a sulfur atom.

17. An organic composition according to claim 15 wherein Z is a nitrogen atom.

18. An organic composition according to claim 15 wherein Z is a nitrogen atom containing hydrogen or a substituted or unsubstituted alkyl group having 1 to 12 carbon atoms.

19. An organic composition according to claim 15 wherein Z is an oxygen atom.

20. An organic composition according to claim 3 wherein Y is carbon.

21. An organic composition according to claim 20 wherein Z is a sulfur atom.

22. An organic composition according to claim 20 wherein Z is a nitrogen atom.

23. An organic composition according to claim 20 wherein Z is a nitrogen atom containing hydrogen or a substituted or unsubstituted lower alkyl group containing 1 to 12 carbon atoms.

24. An organic composition according to claim 20 wherein Z is an oxygen atom.

25. An organic composition according to claim 24 having the structure

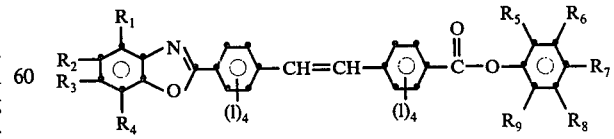

wherein
$R_1$, $R_2$, $R_3$ and $R_4$ are hydrogen, chloro, bromo, lower alkyl, substituted lower alkyl, cycloalkyl, substituted cycloalkyl, aryl, substituted aryl, lower alkylaryl, aryl-substituted-aryl, alkoxy, substituted amino, cyano and the substituents $R_1$ and $R_2$, $R_2$ and $R_3$, and $R_3$ and $R_4$ combined with the carbon atoms to which they are attached are joined alkylene groups completing a carbocyclic ring, which ring can also be substituted with one or more of the substituents listed above for $R_1$, $R_2$, $R_3$ and $R_4$;

I is the same as $R_1$, $R_2$, $R_3$ and $R_4$ and is present on all positions of the benzenoid ring, except the carbon atom attached to the Y substituent and the carbon atom attached to the carboxyl group connecting the heterocyclic aromatic A group with the aromatic B group, said carbonyl connecting group is attached to the benzenoid ring in either the meta or para position from the carbon atom connected to the Y substituent; and at least one $R_5$ or $R_9$ is hydrogen and the other $R_5$, $R_6$, $R_7$, $R_8$ and $R_9$ are hydrogen, lower alkyl, substituted lower alkyl, cycloalkyl, substituted cycloalkyl, aryl, substituted aryl, lower alkylaryl, aryl-substituted-aryl, alkoxy, substituted amino, hydroxy, carboalkoxy, nitrile, chloro, bromo and the substituents $R_5$ and $R_6$, $R_6$ and $R_7$, $R_7$ and $R_8$, and $R_8$ and $R_9$ combined with the carbon atoms to which they are attached are joined alkylene groups completing a carbocyclic ring which can be substituted with any of the substituents listed above for $R_5$, $R_6$, $R_7$, $R_8$ and $R_9$.

26. An organic composition according to claim 25 having the structure

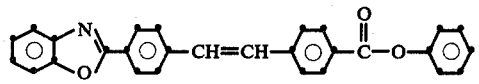

27. An organic composition according to claim 25 having the structure

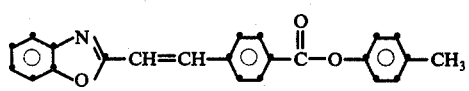

28. An organic composition according to claim 25 having the structure

29. An organic composition according to claim 25 having the structure

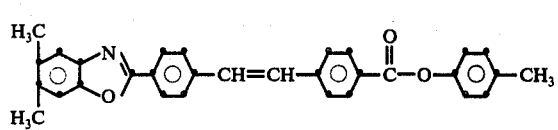

30. An organic composition according to claim 25 having the structure

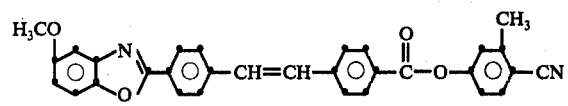

31. An organic composition according to claim 25 having the structure

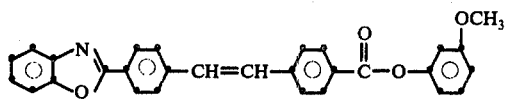

32. An organic composition according to claim 25 having the structure

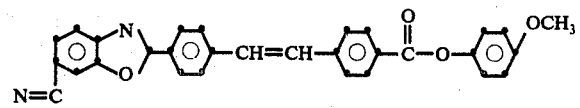

33. An organic composition according to claim 25 having the structure

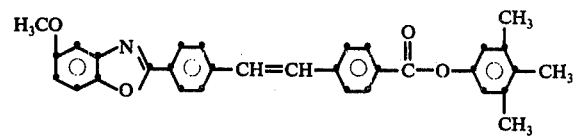

34. An organic composition according to claim 1 wherein A has the structure

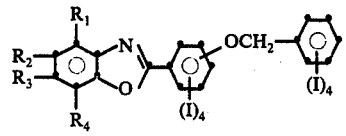

wherein $R_1$, $R_2$, $R_3$ and $R_4$ are hydrogen, chloro, bromo, lower alkyl, substituted lower alkyl, cycloalkyl, substituted cycloalkyl, aryl, substituted aryl, lower alkylaryl, aryl-substituted-aryl, alkoxy, substituted amino, cyano and the substituents $R_1$ and $R_2$, $R_2$ and $R_3$, and $R_3$ and $R_4$ combined with the carbon atoms to which they are attached are joined alkylene groups completing a carbocyclic ring, which ring can also be substituted with one or more of the substituents listed above for $R_1$, $R_2$, $R_3$ and $R_4$; and I is the same as $R_1$, $R_2$, $R_3$ and $R_4$ and is present on all positions of the benzenoid ring, except the carbon atom attached to the Y substituent and the carbon atom attached to the carboxyl group connecting the heterocyclic aromatic A group with the aromatic B group, said carbonyl connecting group is attached to the benzenoid ring in either the meta or para position from the carbon atom connected to the Y substituent.

35. An organic composition according to claim 34 having the structure

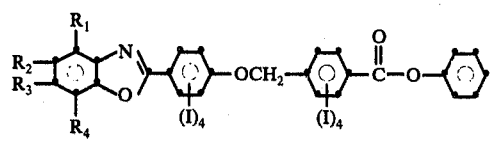

wherein $R_1$, $R_2$, $R_3$ and $R_4$ are hydrogen, chloro, bromo, lower alkyl, substituted lower alkyl, cycloalkyl, substituted cycloalkyl, aryl, substituted aryl, lower alkylaryl aryl-substituted-aryl, alkoxy, substituted amino, cyano and the substituents $R_1$ and $R_2$, $R_2$ and $R_3$, and $R_3$ and $R_4$ combined with the carbon atoms to which they are attached are joined alkylene groups completing a carbocyclic ring, which ring can also be substituted with one or more of the substituents listed above for $R_1$, $R_2$, $R_3$ and $R_4$;

I is the same as $R_1$, $R_2$, $R_3$ and $R_4$ and is present on all positions of the benzenoid ring, except the carbon atom attached to the Y substituent and the carbon atom attached to the carboxyl group connecting the heterocyclic aromatic A group with the aromatic B group, said carbonyl connecting group is attached to the benzenoid ring in either the meta or para position from the carbon atom connected to the Y substituent; and at least one $R_5$ or $R_9$ is hydrogen and the other $R_5$, $R_6$, $R_7$, $R_8$ and $R_9$ are hydrogen, lower alkyl, substituted lower alkyl, cycloalkyl, substituted cycloalkyl, aryl, substituted aryl, lower alkylaryl, aryl-substituted-aryl, alkoxy, substituted amino, hydroxy, carboalkoxy, nitrile, chloro, bromo and the substituents $R_5$ and $R_6$, $R_6$ and $R_7$, $R_7$ and $R_8$, and $R_8$ and $R_9$ combined with the carbon atoms to which they are attached are joined alkylene groups completing a carbocyclic ring which can be substituted with any of the substituents listed above for $R_5$, $R_6$, $R_7$, $R_8$ and $R_9$.

36. An organic composition according to claim 34 having the structure

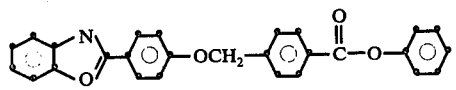

37. An organic composition according to claim 35 having the structure

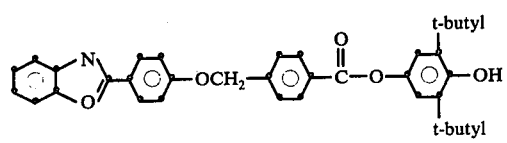

38. An organic composition according to claim 35 having the structure

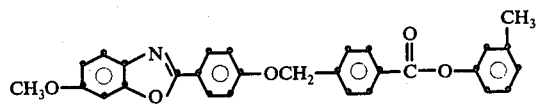

39. An organic composition according to claim 35 having the structure

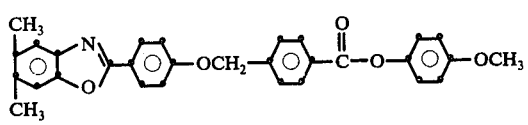

40. An organic composition according to claim 35 having the structure

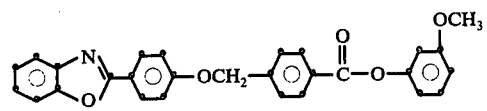

41. An organic composition according to claim 35 having the structure

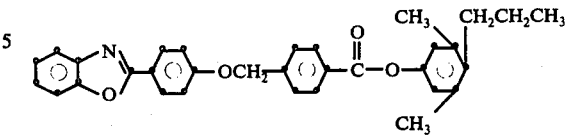

42. An organic composition according to claim 25 having the structure

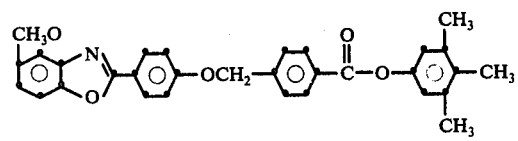

43. An organic composition according to claim 1 wherein A has the structure

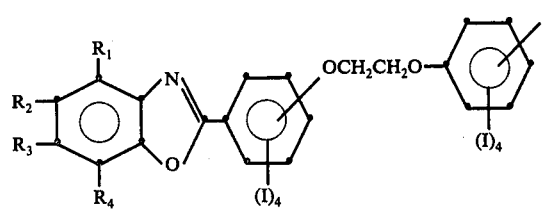

44. An organic composition according to claim 43 having the structure

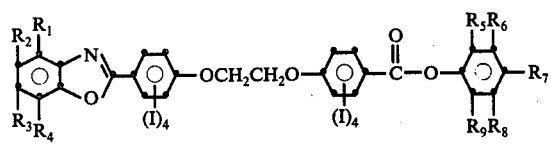

wherein $R_1$, $R_2$, $R_3$ and $R_4$ are hydrogen, chloro, bromo, lower alkyl, substituted lower alkyl, cycloalkyl, substituted cycloalkyl, aryl, substituted aryl, lower alkylaryl, aryl-substituted-aryl, alkoxy, substituted amino, cyano and the substituents $R_1$ and $R_2$, $R_2$ and $R_3$, and $R_3$ and $R_4$ combined with the carbon atoms to which they are attached are joined alkylene groups completing a carbocyclic ring, which ring can also be substituted with one or more of the substituents listed above for $R_1$, $R_2$, $R_3$ and $R_4$; and I is the same as $R_1$, $R_2$, $R_3$ and $R_4$ and is present on all positions of the benzenoid ring, except the carbon atom attached to the Y substituent and the carbon atom attached to the carboxyl group connecting the heterocyclic aromatic A group with the aromatic B group, said carbonyl connecting group is attached to the benzenoid ring in either the meta or para position from the carbon atom connected to the Y substituent.

45. An organic composition according to claim 44 having the structure

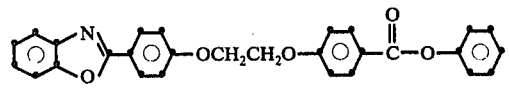

46. An organic composition according to claim 44 having the structure

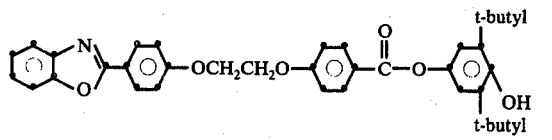

47. An organic composition according to claim 44 having the structure

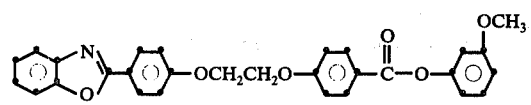

48. An organic composition according to claim 44 having the structure

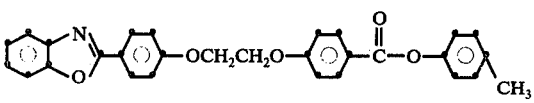

49. An organic composition according to claim 44 having the structure

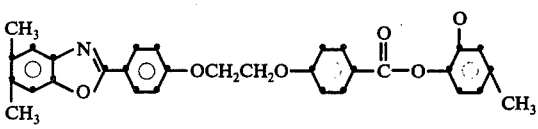

50. An organic composition according to claim 44 having the structure

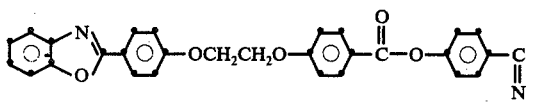

51. An organic composition according to claim 44 having the structure

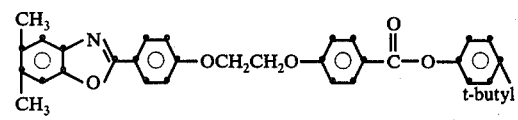

52. An organic composition according to claim 1 wherein A has the structure

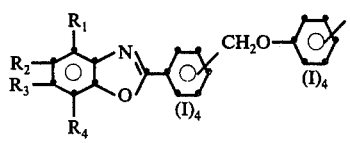

wherein $R_1$, $R_2$, $R_3$ and $R_4$ are hydrogen, chloro, bromo, lower alkyl, substituted lower alkyl, cycloalkyl, substituted cycloalkyl, aryl, substituted aryl, lower alkylaryl, aryl-substituted-aryl, alkoxy, substituted amino, cyano and the substituents $R_1$ and $R_2$, $R_2$ and $R_3$, and $R_3$ and $R_4$ combined with the carbon atoms to which they are attached are joined alkylene groups completing a carbocyclic ring, which ring can also be substituted with one or more of the substituents listed above for $R_1$, $R_2$, $R_3$ and $R_4$; and I is the same as $R_1$, $R_2$, $R_3$ and $R_4$ and is present on all positions of the benzenoid ring, except the carbon atom attached to the Y substituent and the carbon atom attached to the carboxyl group connecting the heterocyclic aromatic A group with the aromatic B group, said carbonyl connecting group is attached to the benzenoid ring in either the meta or para position from the carbon atom connected to the Y substituent.

53. An organic composition according to claim 52 having the structure

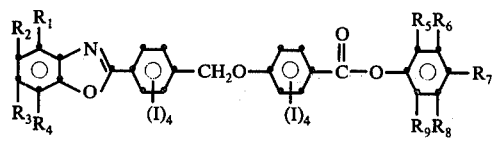

wherein $R_1$, $R_2$, $R_3$ and $R_4$ are hydrogen, chloro, bromo, lower alkyl, substituted lower alkyl, cycloalkyl, substituted cycloalkyl, aryl, substituted aryl, lower alkylaryl, aryl-substituted-aryl, alkoxy, substituted amino, cyano and the substituents $R_1$ and $R_2$, $R_2$ and $R_3$, and $R_3$ and $R_4$ combined with the carbon atoms to which they are attached are joined alkylene groups completing a carbocyclic ring, which ring can also be substituted with one or more of the substituents listed above for $R_1$, $R_2$, $R_3$ and $R_4$;

I is the same as $R_1$, $R_2$, $R_3$ and $R_4$ and is present on all positions of the benzenoid ring, except the carbon atom attached to the Y substituent and the carbon atom attached to the carboxyl group connecting the heterocyclic aromatic A group with the aromatic B group, said carbonyl connecting group is attached to the benzenoid ring in either the meta or para position from the carbon atom connected to the Y substituent; and at least one $R_5$ or $R_9$ is hydrogen and the other $R_5$, $R_6$, $R_7$, $R_8$ and $R_9$ are hydrogen, lower alkyl, substituted lower alkyl, cycloalkyl, substituted cycloalkyl, aryl, substituted aryl, lower alkylaryl, aryl-substituted-aryl, alkoxy, substituted amino, hydroxy, carboalkoxy, nitrile, chloro, bromo and the substituents $R_5$ and $R_6$, $R_6$ and $R_7$, $R_7$ and $R_8$, and $R_8$ and $R_9$ combined with the carbon atoms to which they are attached are joined alkylene groups completing a carbocyclic ring which can be substituted with any of the substituents listed above for $R_5$, $R_6$, $R_7$, $R_8$ and $R_9$.

54. An organic composition according to claim 53 having the structure

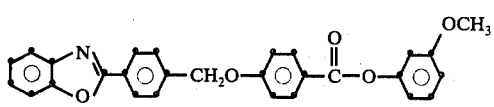

55. An organic composition according to claim 53 having the structure

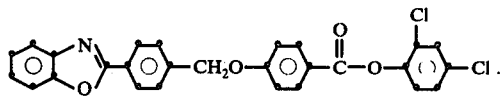

56. An organic composition according to claim 53 having the structure

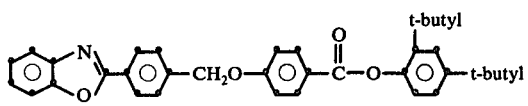

57. An organic composition according to claim 53 having the structure

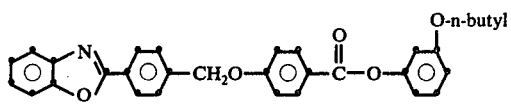

58. An organic composition according to claim 53 having the structure

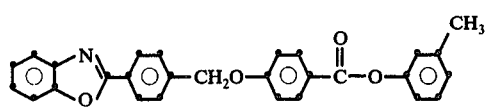

59. An organic composition according to claim 53 having the structure

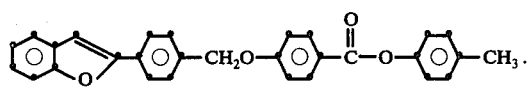

60. An organic composition according to claim 53 having the structure

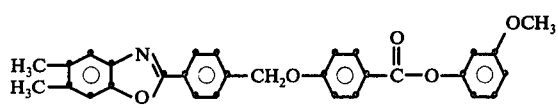

61. An organic composition according to claim 1 wherein A has the structure

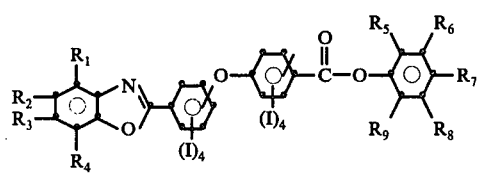

wherein $R_1$, $R_2$, $R_3$ and $R_4$ are hydrogen, chloro, bromo, lower alkyl, substituted lower alkyl, cycloalkyl, substituted cycloalkyl, aryl, substituted aryl, lower alkylaryl, aryl-substituted-aryl, alkoxy, substituted amino, cyano and the substituents $R_1$ and $R_2$, $R_2$ and $R_3$, and $R_3$ and $R_4$ combined with the carbon atoms to which they are attached are joined alkylene groups completing a carbocyclic ring, which ring can also be substituted with one or more of the substituents listed above for $R_1$, $R_2$, $R_3$ and $R_4$;

I is the same as $R_1$, $R_2$, $R_3$ and $R_4$ and is present on all positions of the benzenoid ring, except the carbon atom attached to the Y substituent and the carbon atom attached to the carboxyl group connecting the heterocyclic aromatic A group with the aromatic B group, said carbonyl connecting group is attached to the benzenoid ring in either the meta or para position from the carbon atom connected to the Y substituent; and at least one $R_5$ or $R_9$ is hydrogen and the other $R_5$, $R_6$, $R_7$, $R_8$ and $R_9$ are hydrogen, lower alkyl, substituted lower alkyl, cycloalkyl, substituted cycloalkyl, aryl, substituted aryl, lower alkylaryl, aryl-substituted-aryl, alkoxy, substituted amino, hydroxy, carboalkoxy, nitrile, chloro, bromo and the substituents $R_5$ and $R_6$, $R_6$ and $R_7$, $R_7$ and $R_8$, and $R_8$ and $R_9$ combined with the carbon atoms to which they are attached are joined alkylene groups completing a carbocyclic ring which can be substituted with any of the substituents listed above for $R_5$, $R_6$, $R_7$, $R_8$ and $R_9$.

62. An organic composition according to claim 61 having the structure

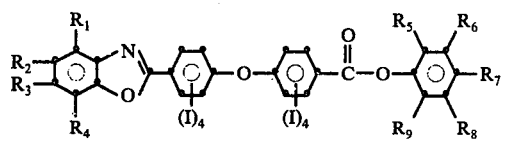

wherein $R_1$, $R_2$, $R_3$ and $R_4$ are hydrogen, chloro, bromo, lower alkyl, substituted lower alkyl, cycloalkyl, substituted cycloalkyl, aryl, substituted aryl, lower alkylaryl, aryl-substituted-aryl, alkoxy, substituted amino, cyano and the substituents $R_1$ and $R_2$, $R_2$ and $R_3$, and $R_3$ and $R_4$ combined with the carbon atoms to which they are attached are joined alkylene groups completing a carbocyclic ring, which ring can also be substituted with one or more of the substituents listed above for $R_1$, $R_2$, $R_3$ and $R_4$;

I is the same as $R_1$, $R_2$, $R_3$ and $R_4$ and is present on all positions of the benzenoid ring, except the carbon atom attached to the Y substituent and the carbon atom attached to the carboxyl group connecting the heterocyclic aromatic A group with the aromatic B group, said carbonyl connecting group is attached to the benzenoid ring in either the meta or para position from the carbon atom connected to the Y substituent; and at least one $R_5$ or $R_9$ is hydrogen and the other $R_5$, $R_6$, $R_7$, $R_8$ and $R_9$ are hydrogen, lower alkyl, substituted lower alkyl, cycloalkyl, substituted cycloalkyl, aryl, substituted aryl, lower alkylaryl, aryl-substituted-aryl, alkoxy, substituted amino, hydroxy, carboalkoxy, nitrile, chloro, bromo and the substituents $R_5$ and $R_6$, $R_6$ and $R_7$, $R_7$ and $R_8$, and $R_8$ and $R_9$ combined with the carbon atoms to which they are attached are joined alkylene groups completing a carbocyclic ring which can be substituted with any of the substituents listed above for $R_5$, $R_6$, $R_7$, $R_8$ and $R_9$.

63. An organic composition according to claim 62 having the structure

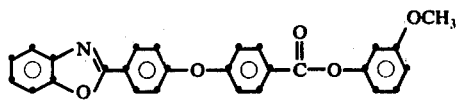

64. An organic composition according to claim 62 having the structure

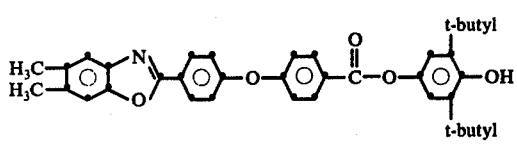

65. An organic composition according to claim 62 having the structure

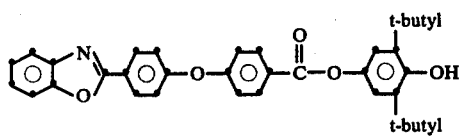

66. An organic composition according to claim 62 having the structure

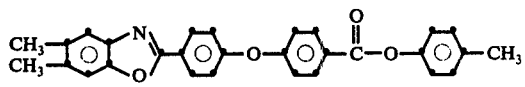

67. An organic composition according to claim 62 having the structure

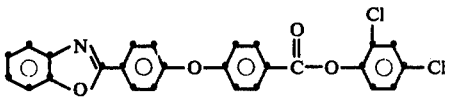

68. An organic composition according to claim 62 having the structure

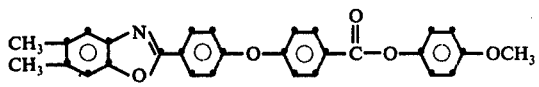

69. An organic composition according to claim 62 having the structure

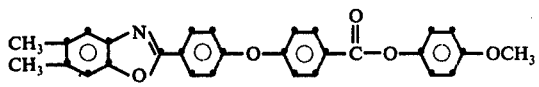

* * * * *

UNITED STATES PATENT AND TRADEMARK OFFICE
CERTIFICATE OF CORRECTION

PATENT NO. : 4,096,115
DATED : June 20, 1978
INVENTOR(S) : Gether Irick, Jr. and Charles A. Kelly It is certified that error appears in the above-identified patent and that said Letters Patent are hereby corrected as shown below:

Column 21, line 30, the formula should read

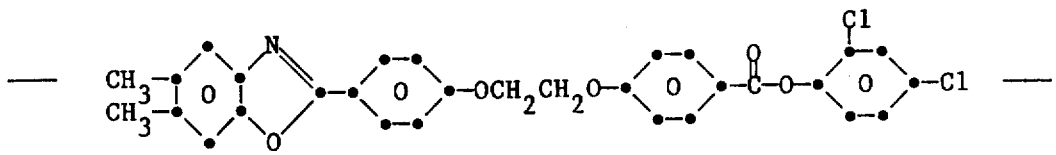

Signed and Sealed this

Twenty-sixth Day of June 1979

[SEAL]

Attest:

RUTH C. MASON
*Attesting Officer*

DONALD W. BANNER
*Commissioner of Patents and Trademarks*